July 10, 1951 — A. BARRY — 2,560,326
CLAMPING DEVICE FOR GRAVITY METERS
Filed March 7, 1947 — 2 Sheets-Sheet 1

Adelbert Barry. INVENTOR.
BY
J. G. McKean
ATTORNEY.

Patented July 10, 1951

2,560,326

UNITED STATES PATENT OFFICE 2,560,326

CLAMPING DEVICE FOR GRAVITY METERS

Adelbert Barry, Houston, Tex., assignor, by mesne assignments, to Standard Oil Development Company, Elizabeth, N. J., a corporation of Delaware Application March 7, 1947, Serial No. 733,257

6 Claims. (Cl. 73—382)

The present invention is directed to a device for clamping and releasing a mass which is suspended from a universal joint or a fixed pivot point. More particularly, the invention is directed to an apparatus for clamping and releasing by remote control a mass (for example, any device for measuring changes in the earth's gravitational or magnetic field) which is suspended on a gimbal or universal joint.

In surveying the earth's surface for structures favorable for oil production, it has been customary, for a number of years, to employ meters whereby anomalies of a subsurface structure are detected. For example, data obtained by a gravity meter allows contours of relatively high and relatively low readings to be established around promising structures from which oil may be produced. However, when a conventional meter is adapted for prospecting oil structures below the surface of the sea, problems are encountered. For example, such meters are usually free swinging and act as a pendulum; therefore, it is difficult to bring it to rest especially when it is lowered over the side of a vessel which is subjected to wave action and into water which itself may be in a disturbed condition.

It is common practice to enclose the meter of the type mentioned above in a suitable housing to protect it from contact with the water and to obtain readings of gravity by remote control from the mechanism which is lowered to the floor of the sea. As mentioned before, employment of the meter in this manner imposes the problem of dampening the swing of the suspended mass. The problem also exists to a lesser degree when transporting this type of gravity meter over the land or on board ship.

It is, therefore, the main object of the present invention to provide apparatus for clamping and releasing by remote control a mass suspended from a universal joint or other fixed pivot points such as the gimbal suspended gravity meter.

Another object of the invention is to dampen the swing of a free swinging mass.

The objects of the present invention are achieved by providing a latching and releasing mechanism actuatable remotely so that an irregularity or protrusion on the mass may be engaged and the mass maintained in a fixed position until it is released.

Briefly, the present invention may be described as embodying a mass suspended to swing freely inside of an outer housing and a remotely controlled solenoid actuated clamping mechanism engaging and releasing a knob on the free swinging mass.

The invention will be better understood by reference to the drawing in which—

Figure 2:
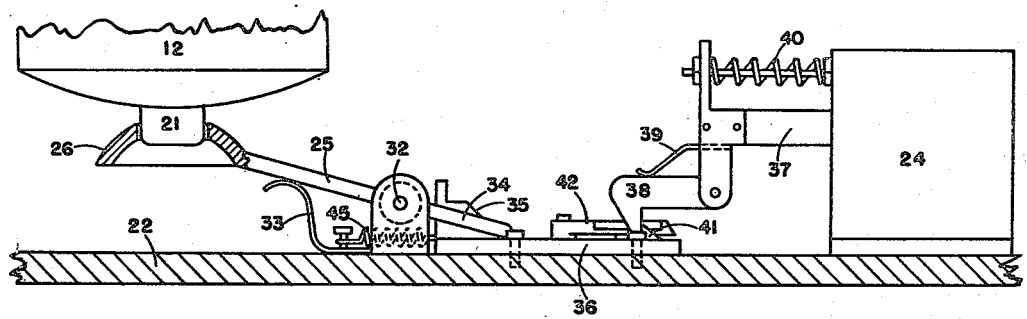
Figure 2 is a detail of the clamping mechanism in clamping position.
Figure 2A:
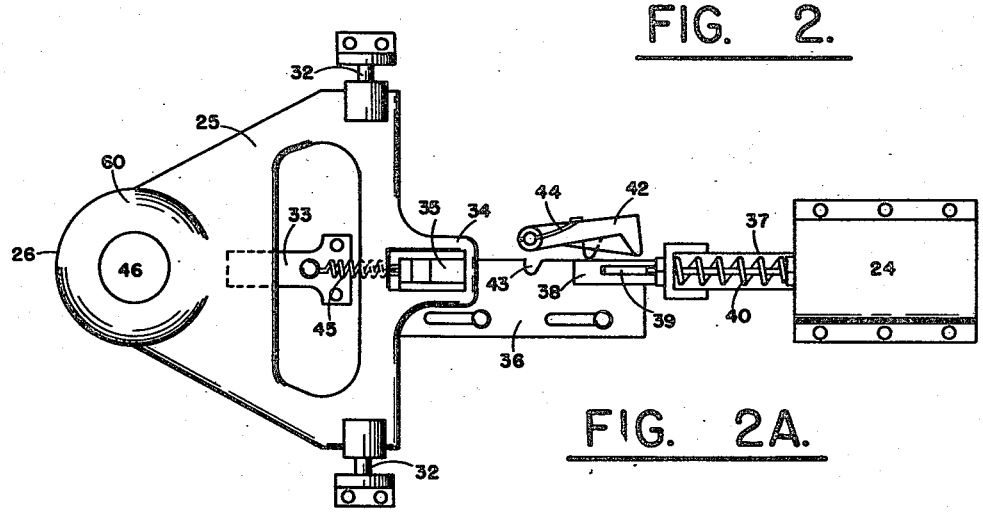
Figure 2A is a view of Figure 2 looking downwardly on the clamping mechanism of the clamping device.
Figure 1:
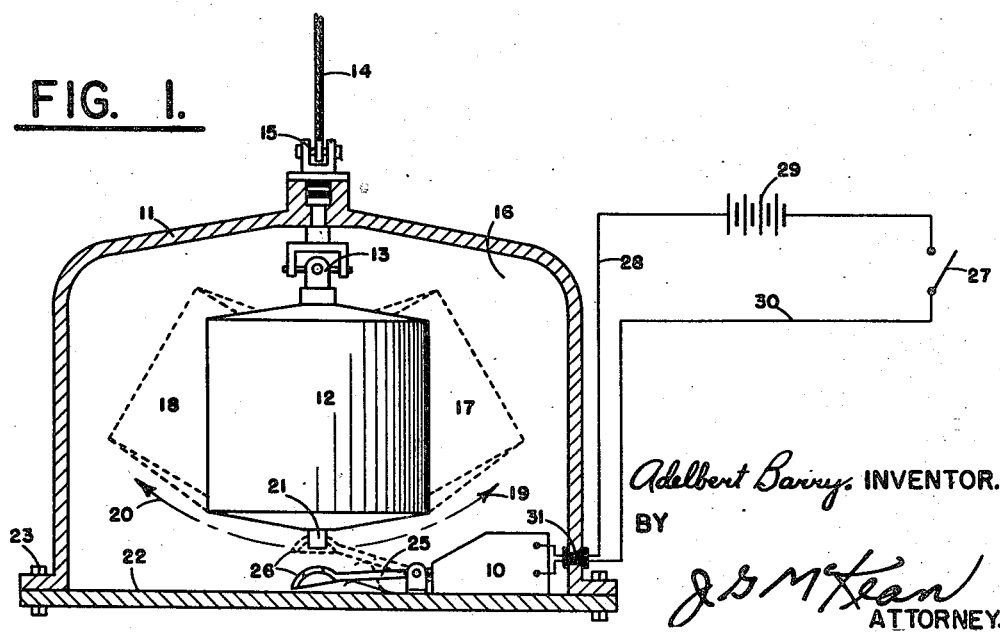
Figure 1 is a sectional view of an assembly of the present invention including the mechanism in place for lowering to the floor of the sea.

Referring now to the drawing, numeral 11 designates a housing in which a mass 12, which may be any measuring device (for example, a gravity meter), is suspended by a gimbal arrangement or universal joint or other pivot points indicated by numeral 13.

The housing 11 is suspended by a cable 14 attached to the housing by attaching means indicated by numeral 15.

The mass 12 is able to swing in all directions in the space 16 defined by the bell 11 into positions shown by 17 and 18, for example, and indicated by arrows 19 and 20. The mass 12 is provided with a knob or protrusion 21 on its lower end.

The housing 11 is closed by bottom plate 22 affixed by bolts or closure mechanism 23.

Affixed to the bottom plate 22 is a solenoid activated clamping means including an arm 25 and a lock clamp 26 engageable with the knob or protrusion 21. Solenoid 24 is remotely controlled by switch 27 and the circuit defined by electrical lead 28, battery 29, and electrical lead 30. The electrical leads 28 and 30 pass through a plug or insulator 31 in the housing 11. The solenoid activated mechanism is enclosed in housing 10.

In operating the device of the present invention, the heavy full lines defining the mass 12 in the vertical position shows the device with the clamp 26 engaging the knob 21. When the mass 12 is free swinging, the clamp 26 is released and the mass 12 may assume the positions indicated by numerals 17 and 18 and shown by arrows 19 and 20.

Figure 2 shows in detail the solenoid 24, arm 25, and clamp 26, with the clamp 26 engaging the knob 21 of mass 12. The arm 25 is mounted on pivots 32—32 and biased in an upward direction by a spring 33. The tail 34 of arm 25 encloses an inclined plane 35 of a slide piece 36. The solenoid 24 carries at the outer end of its moving core 37 a hook 38 biased downwardly by spring 39. On application of current to solenoid 24 by closing switch 27 and completing the circuit of conductors or leads 28 and 30, the core 37 retracts inward in the usual manner and, upon breaking the current, spring 40 returns the solenoid core 37 to its outward position. Upon operation of solenoid 24, slide piece 36 is pulled towards the solenoid 24 by the hook 38 which engages dog 41 on the slide 36. As slide 36 is drawn towards solenoid 24, the inclined plane 35 raises the tail 34 of arm 25 which pivots arm 25 to release knob 21 of mass 12. In traveling to this position, the slide 36 is engaged by latch 42 which holds slide 36 by means of notch 43 in lock-back position at the same time moving into the path of the returning hook 38 and causing hook 38 to be raised and placed in a position on top of latch 42 at the end of the return stroke of solenoid core 37. This operation will be described more completely with reference to Figures 3 and 3A.

Figure 3:
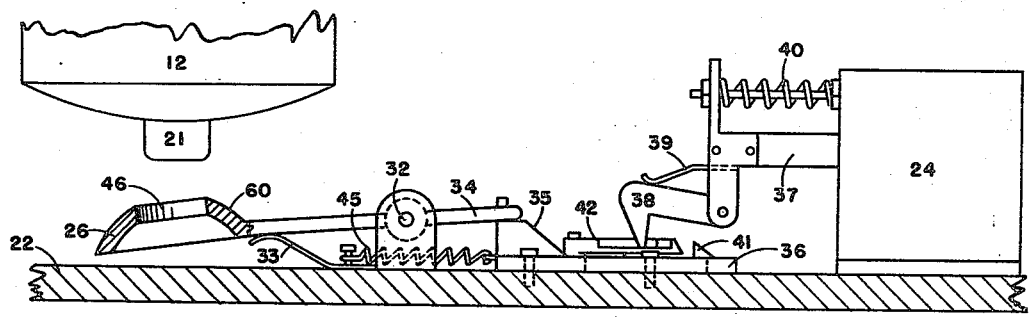
Figure 3 is a detail of the apparatus of Figure 2 with the apparatus in release position.
Figure 3A:
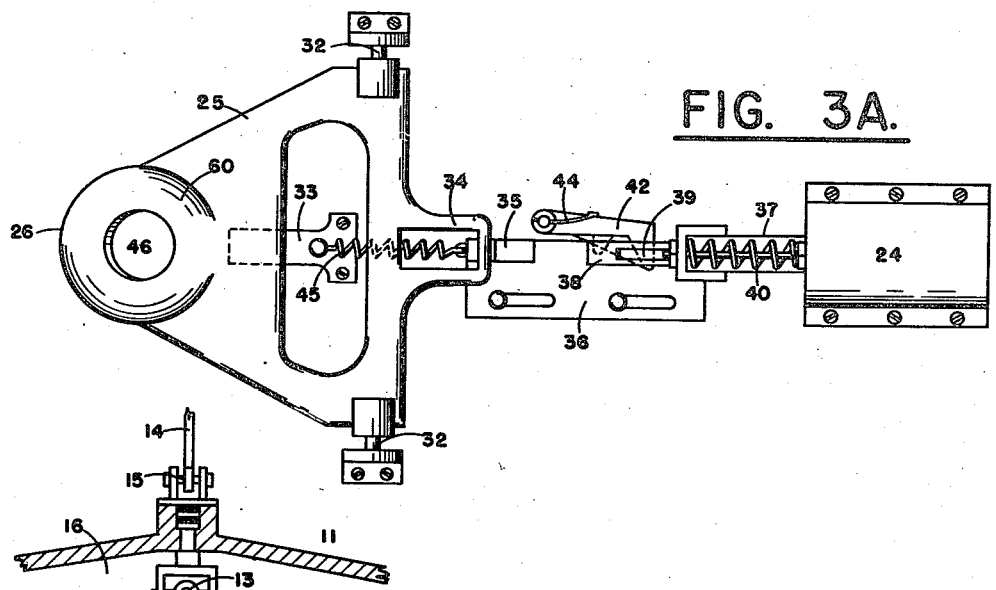
Figure 3A is a view of the apparatus of Figure 3 looking downward on the apparatus in release position.

Referring now to Figure 3, on actuation of solenoid 24, hook 38 moves latch 42 out against its loading spring 44 thereby releasing slide 36 which is drawn back to its original position by spring 45 before hook 38 has cleared the latch 42. Hook 38 then clears 42 and falls down on slide 36 to return on the release stroke of solenoid core 37 to jump dog 41 on slide 36 to its original position in readiness for another cycle of the operation. This release of slide 36 causes the tail 34 of arm 25 to be lowered from the position shown in Figure 3 thereby allowing spring 33 to raise clamp 26 to encircle knob 21 of mass 12. In this position, in the event that knob 21 is not in position to be caught, the knob 21 of mass 12 can find the opening 46 of clamp 26 by striking the arcuate surface 60 of arm 25 and clamp 26 camming the clamp assembly 25 and 26 downward toward plate 22 and thus permitting the knob 21 to enter the hole 46 of clamp 26.

While the solenoid arrangement has been shown as actuating an arm which pivots a clamp, it may be possible in other types of housing designs to use other solenoid actuated engaging means for holding mass 12 in a fixed position within housing 11.

Figure 4:
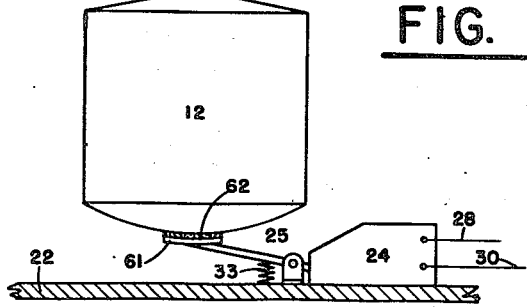
Figure 4 is a view of another engagement means suitable for use in the clamping means of Figures 1 to 3A, inclusive.

Another objective of this invention is to provide means for shortening the time necessary to bring mass 12 to rest. Referring to Figure 4, this objective is accomplished as follows. Arm 25 is provided with a concave upward cup 61 which in turn is provided with a liner of frictional material 62 and the radius of curvatures of the bottom of mass 12 and cup 61 are the same. The radii are defined by the distance from the suspension point of the mass 12 to its bottom surface. The solenoid is operated to raise arm 25 and consequently cup 61 against bottom of mass 12 where frictional liner 62 acts to decrease the amplitude of oscillations of mass 12. Upon release of cup 61 mass 12 is permitted to come to rest after a few oscillations of small amplitude.

While not shown in the drawing or described in the description, it will be apparent to the skilled worker that the gravity meter mass 12 must be equipped with pig-tail leads from the mass 12 to the gimbal or universal joint 13 which will lead away from the case or bell 11 by electrical conductors through plugs similar to plug 31.

The nature and objects of the present invention having been fully described and illustrated, what I wish to claim as new and useful and to secure by Letters Patent is:

1. In a device for prospecting subsurface formations including a diving bell, a gimbal suspension, a meter suspended in the diving bell by the gimbal suspension, the lower portion of the meter defining a contact surface having its center on the same vertical line as the center point of the gimbal suspension when the diving bell is level, the combination with said diving bell of a clamping arm pivoted to the diving bell and defining a contact surface engaged with the contact surface of the meter when the vertical axes of the meter and the diving bell coincide and the arm is in a first position and wholly out of contact with the meter when the arm is in a second position, a spring means biasing the arm to its first position, a solenoid, releasable means actuated by the solenoid for retaining the arm in its second position and releasable to allow it to assume its first position and a switching means located remotely from and outside said diving bell for actuating said solenoid and connected electrically therewith.

2. A device in accordance with claim 1 in which the lower portion of the meter defines a nob having an axis coinciding with the axis of the gimbal suspension when the driving bell is level and in which the clamping arm defines a hole to engage said nob.

3. A device in accordance with claim 1 in which the contact surface of the meter is spherical with the radius of curvature defined by the distance of the suspension point of the meter to said spherical surface and in which the clamping arm defines a friction surface having the same radius of curvature as the spherical surface of the meter and engageable therewith.

4. In a device for prospecting subsurface formations which comprises a diving bell, a gimbal suspension, a meter mounted in the diving bell by said gimbal suspension with the lower portion of the meter defining a contact surface having its center on the same vertical line as the center point of the gimbal suspension when the diving bell is level, the combination with said diving bell of a clamping arm pivoted to the diving bell and defining a contact surface engaged with the contact surface of the meter when the vertical axes of the meter and diving bell coincide and the arm is in a first position and wholly out of contact with the meter when the arm is in a second position, a first spring means biasing the clamping arm to its first position, a slide member slidable from a first to a second position and arranged to cooperate with said clamping arm to move it from its first to its second position upon said slidable movement, a second spring means arranged to bias said slide from its second to its first position, a releasable lock arranged to hold said slide in its second position, a solenoid, a switching means located remotely from and outside said diving bell for actuating said solenoid and connected electrically therewith, a catch activated by said solenoid arranged to move said slide from its first to its second position and to release the slide from the lock when the lock is holding said slide into second position.

5. A device in accordance with claim 4 in which the lower portion of the meter defines a nob having an axis coinciding with the axis of the gimbal suspension when the diving bell is level and in which the clamping arm defines a hole to engage said nob.

6. A device in accordance with claim 4 in which the contact surface of the meter is spherical with the radius of curvature defined by the distance of the suspension point of the meter to said sperical surface and in which the clamping arm defines a friction surface have the same radius of curvature as the spherical surface of the meter and engageable therewith.

ADELBERT BARRY.

REFERENCES CITED

The following references are of record in the file of this patent:

UNITED STATES PATENTS

| Number | Name | Date |
|---|---|---|
| 2,081,055 | Kiracofe | May 18, 1937 |
| 2,383,966 | Hasbrook | Sept. 4, 1945 |